(12) United States Patent
Osawa (10) Patent No.: US 12,230,995 B2
(45) Date of Patent: Feb. 18, 2025

(54) AUXILIARY POWER SUPPLY DEVICE AND METHOD FOR CONTROLLING AUXILIARY POWER SUPPLY DEVICE

(71) Applicant: MINEBEA MITSUMI Inc., Nagano (JP)

(72) Inventor: Susumu Osawa, Nagano (JP)

(73) Assignee: MINEBEA MITSUMI Inc., Nagano (JP)

( * ) Notice: Subject to any disclaimer, the term of this patent is extended or adjusted under 35 U.S.C. 154(b) by 0 days.

(21) Appl. No.: 18/549,732

(22) PCT Filed: Mar. 25, 2022

(86) PCT No.: PCT/JP2022/014725
§ 371 (c)(1),
(2) Date: Sep. 8, 2023

(87) PCT Pub. No.: WO2022/210441
PCT Pub. Date: Oct. 6, 2022

(65) Prior Publication Data
US 2024/0170999 A1    May 23, 2024

(30) Foreign Application Priority Data
Mar. 30, 2021   (JP) .................. 2021-056570

(51) Int. Cl.
*H02J 7/34*     (2006.01)
*B60R 16/033*   (2006.01)
(Continued)

(52) U.S. Cl.
CPC ............ *H02J 7/345* (2013.01); *B60R 16/033* (2013.01); *H02J 1/10* (2013.01); *H02J 7/005* (2020.01); *H02J 7/00712* (2020.01)

(58) Field of Classification Search
CPC .... H02J 7/345; H02J 1/10; H02J 7/005; H02J 7/00712; H02J 9/061; H02J 2207/50; H02J 7/0019; B60R 16/033
See application file for complete search history.

(56) References Cited

U.S. PATENT DOCUMENTS

| | | | |
|---|---|---|---|
| 2005/0269870 A1 | 12/2005 | Ohashi et al. | |
| 2011/0185211 A1* | 7/2011 | Chiasson | G06F 1/3287 |
| | | | 714/48 |

(Continued)

FOREIGN PATENT DOCUMENTS

| | | |
|---|---|---|
| JP | H10-201091 | 7/1998 |
| JP | 2005-028908 | 2/2005 |

(Continued)

OTHER PUBLICATIONS

International Search Report of Int. Appl. No. PCT/JP2022/014725 dated Jun. 7, 2022.

*Primary Examiner* — Rexford N Barnie
*Assistant Examiner* — Thai H Tran
(74) *Attorney, Agent, or Firm* — IPUSA, PLLC (57) ABSTRACT

An auxiliary power supply device includes a storage circuit having first and second electrical double layer capacitors connected in series between first and second nodes, a first switch element having a first terminal coupled to the first node, and a second terminal, a first discharging resistor provided between the second terminal and a fourth node, a second discharging resistor provided between the fourth node and ground, a second switch element having a third terminal coupled to a third node between the first and second electrical double layer capacitors, and a fourth terminal coupled to the fourth node, and a measurement controller. The measurement controller performs a procedure to compute a capacitance value of the storage circuit as a first (Continued)

process, and a procedure to connect the first switch element and connect the second switch element as a second process.

9 Claims, 8 Drawing Sheets

(51) Int. Cl.
*H02J 1/10* (2006.01)
*H02J 7/00* (2006.01)

(56) References Cited

U.S. PATENT DOCUMENTS

| | | | |
|---|---|---|---|
| 2012/0161792 A1 | 6/2012 | Ikeda et al. | |
| 2014/0002104 A1* | 1/2014 | Yang | G01R 31/64 |
| | | | 324/548 |
| 2014/0114592 A1* | 4/2014 | Eilertsen | G01R 31/64 |
| | | | 702/58 |
| 2015/0329009 A1 | 11/2015 | Dente | |

FOREIGN PATENT DOCUMENTS

| | | |
|---|---|---|
| JP | 2012-100517 | 5/2012 |
| JP | 2012-137341 | 7/2012 |
| JP | 2014-187734 | 10/2014 |
| JP | 6675874 | 4/2020 |

* cited by examiner

AUXILIARY POWER SUPPLY DEVICE AND METHOD FOR CONTROLLING AUXILIARY POWER SUPPLY DEVICE

TECHNICAL FIELD

The present disclosure relates to auxiliary power supply devices and methods for controlling auxiliary power supply devices.

BACKGROUND ART

In a vehicle, a known backup power supply is provided to supply electric energy in place of a main power supply or to supplement the main power supply, in a case where a failure or interruption of the main power supply occurs (for example, refer to Patent Document 1).

PRIOR ART DOCUMENTS

Patent Documents

Patent Document 1: Japanese Patent No. 6675874

DISCLOSURE OF THE INVENTION

Problem to be Solved by the Invention

Patent Document 1 discloses using a super capacitor as the backup power supply. When using an electrical double layer capacitor, such as the super capacitor or the like, as the backup power source, it is necessary to monitor a degraded state of the electrical double layer capacitor.

The present disclosure provides an auxiliary power supply device in which a degraded state of an electrical double layer capacitor of a backup power supply can be monitored.

Means of Solving the Problem

According to one aspect of the present disclosure, there is provided an auxiliary power supply device including a storage circuit having a first node coupled to a power supply, a second node coupled to a ground, and a first electrical double layer capacitor and a second electrical double layer capacitor connected in series between the first node and the second node; a first switch element having a first terminal coupled to the first node, and a second terminal, and configured to make a connection or disconnection between the first terminal and the second terminal; a first discharging resistor provided between the second terminal and a fourth node; a second discharging resistor provided between the fourth node and the ground; a second switch element having a third terminal coupled to a third node between the first electrical double layer capacitor and the second electrical double layer capacitor, and a fourth terminal coupled to the fourth node, and configured to make a connection or disconnection between the third terminal and the fourth terminal; and a measurement controller configured to measure a voltage at the first node, and control the first switch element and the second switch element, wherein the measurement controller performs a first process including a procedure making a disconnection between the third terminal and the fourth terminal by the second switch element, and making a connection between the first terminal and the second terminal, by the first switch element, a procedure measuring the voltage at the first node, to acquire a first voltage value, a procedure determining whether or not the voltage at the first node is lower than or equal to a second voltage value that is lower than the first voltage value, a procedure making a disconnection between the first terminal and the second terminal by the first switch element in a case where the voltage at the first node is lower than or equal to the second voltage value, a procedure computing a time from when the first terminal and the second terminal are connected by the first switch element until when the first terminal and the second terminal are disconnected, and a procedure computing a capacitance value of the storage circuit, based on the time, the first voltage value, and the second voltage value, and a second process including a procedure making a connection between the first terminal and the second terminal by the first switch element, and making a connection between the third terminal and the fourth terminal by the second switch element, and a procedure making a disconnection between the first terminal and the second terminal by the first switch element, and making a disconnection between the third terminal and the fourth terminal by the second switch element, after a predetermined time elapses.

Effects of the Invention

According to the auxiliary power supply device of the present disclosure, it is possible to monitor the degraded state of the electrical double layer capacitor of the backup power supply.

MODE OF CARRYING OUT THE INVENTION

Hereinafter, an auxiliary power supply device according to one embodiment of the present disclosure will be described in detail, with reference to the drawings.

<Auxiliary Power Supply Device 1>

Figure 1:
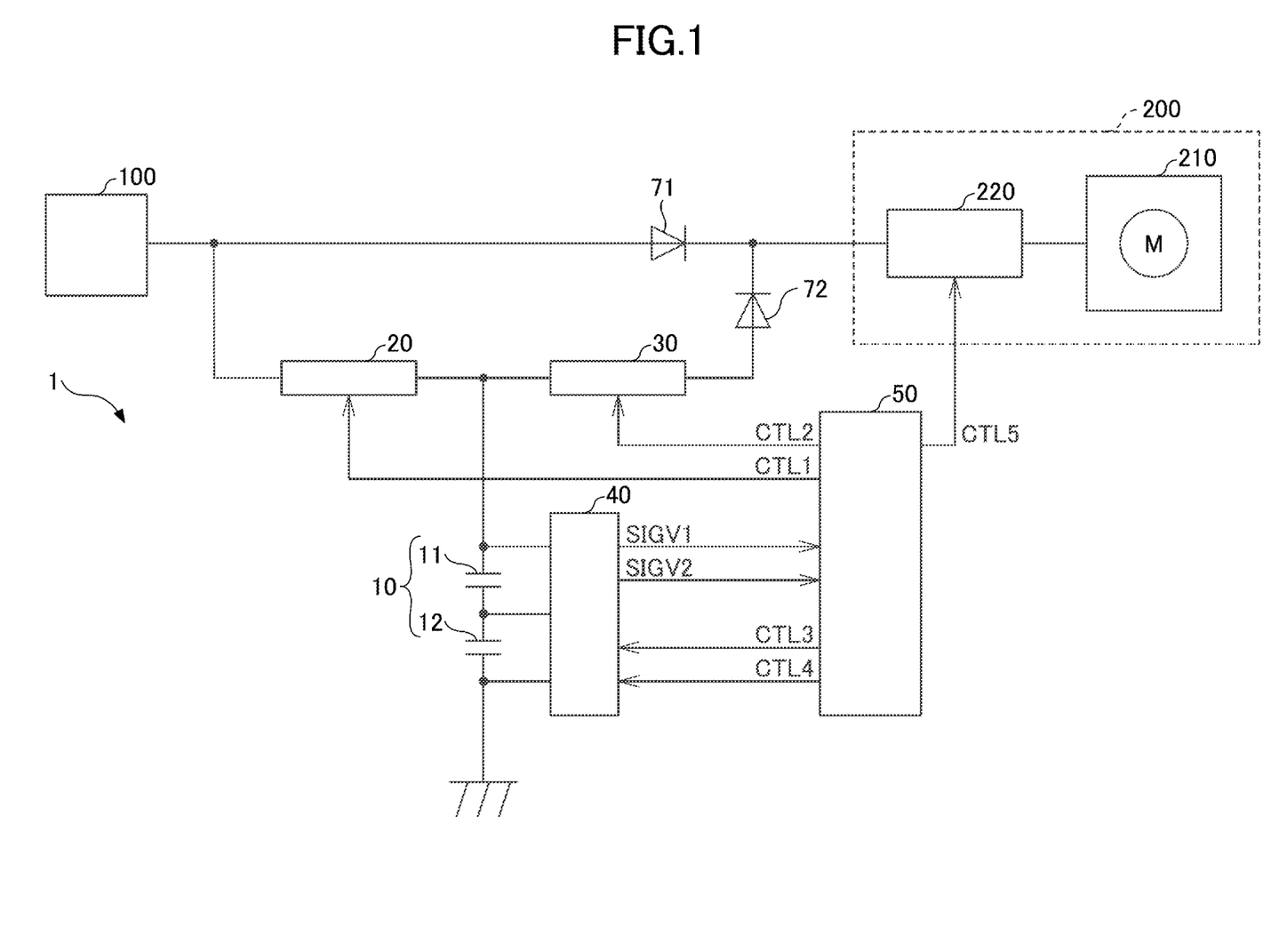
FIG. 1 is a diagram illustrating a configuration example of an auxiliary power supply device according to the present embodiment.

FIG. 1 is a diagram illustrating a configuration example of an auxiliary power supply device 1 according to the present embodiment. In recent years, in a latch mechanism that is a mechanical lock mechanism of an automobile door, a system that operates a lock portion of a latch by a motor is adopted as an electric latch system. The automobile door is required to unlock even in case of an emergency, such as an accident or the like. For this reason, even in a case where a battery power supply fails due to breakage or the like caused by the accident, the electric latch system is required to continue operating for a certain period of time. The auxiliary power supply device 1 according to the present embodiment is used as a backup power supply for the electric latch system.

The auxiliary power supply device 1 stores electric power supplied from a power supply 100. In addition, the auxiliary power supply device 1 supplies electric power to a load device 200 when the electric power from the power supply 100 is cut off. The power supply 100 is also directly connected to the load device 200. The power supply 100 is connected to the load device 200 via a diode 71, in order to prevent a reverse current.

The power supply 100 is an in-vehicle battery, for example. The load device 200 includes a load 210, and a load driving circuit 220 that drives the load 210. The load 210 is a motor in an electric latch system of a motor vehicle door, for example.

The auxiliary power supply device 1 includes a storage circuit 10, a charging circuit 20, a boosting circuit 30, an equalization and discharge circuit 40, and a measurement controller 50. Each constituent element of the auxiliary power supply device 1 will be described.

[Storage Circuit 10]

The storage circuit 10 is a circuit configured to store electric power. The storage circuit 10 includes at least one electrical double layer capacitor, that is, a so-called super capacitor. The storage circuit 10 of the auxiliary power supply device 1 according to the present embodiment includes an electrical double layer capacitor 11 and an electrical double layer capacitor 12 that are connected in series.

[Charging Circuit 20]

The charging circuit 20 charges the storage circuit 10 with the electric power supplied from the power supply 100. The charging circuit 20 performs a charging process based on a charging control signal CTL1 of the measurement controller 50.

[Boosting Circuit 30]

The boosting circuit 30 boosts the electric power supplied from the storage circuit 10, and supplies the boosted electric power to the load device 200. The boosting circuit 30 supplies the electric power based on a boosting control signal CTL2 of the measurement controller 50. The boosting circuit 30 is connected to the load device 200 via a diode 72, in order to prevent a reverse current. The diode 72 may be omitted.

[Equalization and Discharge Circuit 40]

Figure 2:
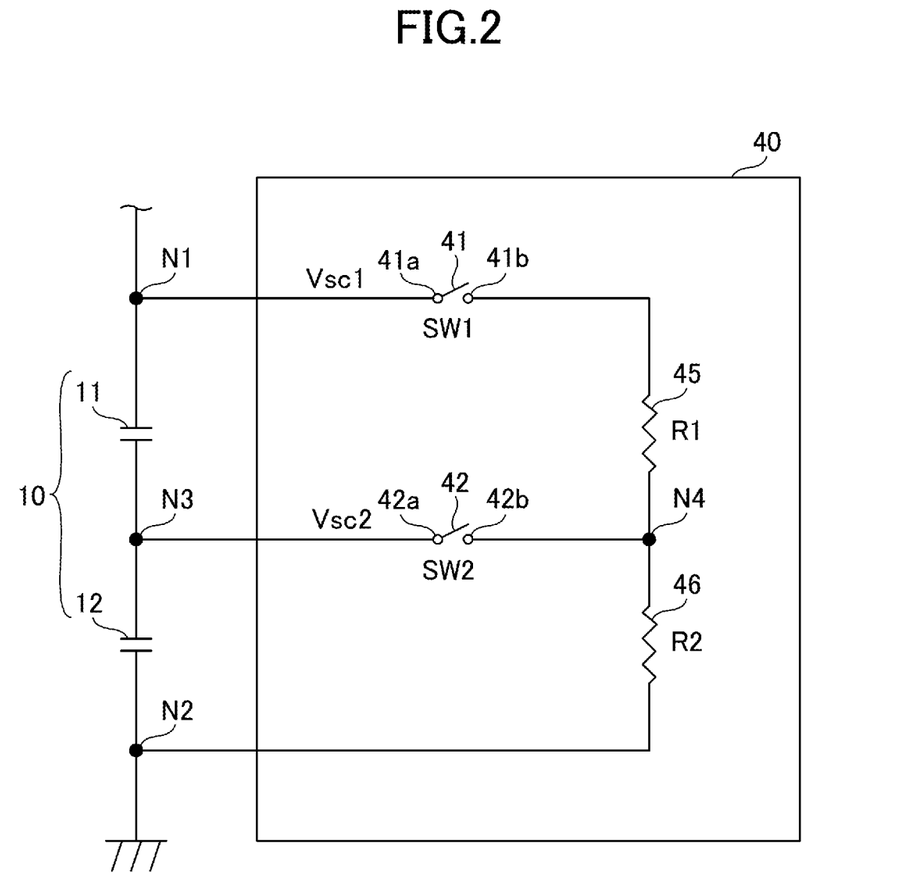
FIG. 2 is a diagram illustrating a configuration example of an equalization and discharge circuit of the auxiliary power supply device according to the present embodiment.

The equalization and discharge circuit 40 performs an equalization process on the storage circuit 10. In addition, the equalization and discharge circuit 40 performs a discharge process on the storage circuit 10. FIG. 2 is a diagram illustrating a configuration example of the equalization and discharge circuit 40 of the auxiliary power supply device 1 according to the present embodiment.

In a case where the electrical double layer capacitors, such as the super capacitors or the like, are connected in series, an imbalance may occur in voltage sharing of the capacitors due to variations in individual leakage currents or the like. When the imbalance occurs in the voltage sharing of the capacitors, there is a possibility that a voltage exceeding a rated value or a set value will be applied to one of the capacitors, even if a voltage of the series-connected capacitors as a whole, obtained by adding the rated voltages of the individual capacitors, falls within a rated voltage. In order to prevent the voltage exceeding the rated value or the set value from being applied to the electrical double layer capacitor 11 or the electrical double layer capacitor 12, the equalization and discharge circuit 40 performs the equalization process to eliminate a voltage sharing imbalance and equalize voltages applied to the respective capacitors.

The equalization and discharge circuit 40 performs the equalization process on the storage circuit 10 based on an equalization control signal CTL3. In addition, the equalization and discharge circuit 40 performs the discharge process based on a discharge control signal CTL4. Further, the equalization and discharge circuit 40 outputs a voltage signal SIGV1 of the electrical double layer capacitor 11 and a voltage signal SIGV2 of the electrical double layer capacitor 12 to the measurement controller 50.

The equalization and discharge circuit 40 includes switches 41 and 42, and resistors 45 and 46. The storage circuit 10 includes the electrical double layer capacitor 11 between a node N1 and a node N3. The storage circuit 10 includes the electrical double layer capacitor 12 between the node N3 and a node N2. The node N1 is connected to the power supply 100 and the load device 200. The node N2 is grounded.

The switch 41 has a first terminal 41a and a second terminal 41b. The switch 41 makes a connection or disconnection between the first terminal 41a and the second terminal 41b. The switch 41 is provided between the node N1 and the resistor 45. The switch 41 is opened and closed based on the equalization control signal CTL3 and the discharge control signal CTL4. In the following description, the switch 41 may also be referred to as a switch SW1.

The resistor 45 is provided between the switch 41 and the node N4. The resistor 45 and the resistor 46 are connected in series at a node N4. The resistor 45 has a resistance value R1.

The switch 42 has a first terminal 42a and a second terminal 42b. The switch 42 makes a connection or disconnection between the first terminal 42a and the second terminal 42b. The switch 42 is provided between the node N3 and the node N4. The switch 42 is opened and closed based on the equalization control signal CTL3 and the discharge control signal CTL4. In the following description, the switch 42 may also be referred to as a switch SW2.

The resistor 46 is provided between the node N4 and the node N2. The resistor 46 has a resistance value R2. The resistance value R2 may be equal to the resistance value R1. A case where the resistance values are equal to each other is not limited to the case where the resistance values perfectly match each other, and includes the case where the resistance values are the same within a range including a manufacturing error, for example.

The equalization and discharge circuit 40 outputs a voltage value Vsc1 at the node N1 to the measurement controller 50, as the voltage signal SIGV1. Moreover, the equalization and discharge circuit 40 outputs a voltage value Vsc2 at the node N3 to the measurement controller 50, as the voltage signal SIGV2. The voltage at the node N1 may also be referred to as a terminal voltage Vsc of the storage circuit 10.

The first terminal 42a of the switch 42 is an example of a third terminal, and the second terminal 42b of the switch 42 is an example of a fourth terminal. In addition, the node N1 is an example of a first node, the node N2 is an example of a second node, the node N3 is an example of a third node, and the node N4 is an example of a fourth node.

[Measurement Controller 50]

The measurement controller 50 controls the charging, electric power supplying, and discharging of the storage circuit 10. The measurement controller 50 measures characteristics of the storage circuit 10. The measurement controller 50 is formed by an electronic control unit (ECU), for example.

The measurement controller 50 controls the charging of the storage circuit 10 by the charging circuit 20 based on the charging control signal CTL1. In addition, the measurement controller 50 controls the electric power supplying to the load device 200 of the boosting circuit 30, based on the boosting control signal CTL2. The measurement controller 50 controls the equalization process of the equalization and discharge circuit 40, based on the equalization control signal CTL3.

Further, the measurement controller 50 controls the discharge process of the equalization and discharge circuit 40, based on the discharge control signal CTL4. The measurement controller 50 controls the load driving circuit 220, based on the drive control signal CTL5.

The measurement controller 50 includes a timer for measuring the time. The measurement controller 50 computes the time, using a number of counts from start to stop of the timer count by the timer.

<Measurement of Characteristics of Storage Circuit 10 by Measurement Controller 50>

The measurement of the characteristics of the storage circuit 10 by the measurement controller 50 of the auxiliary power supply device 1 according to the present embodiment will be described. The characteristics of the storage circuit 10 are determined from a capacitance value and an equivalent series resistance value of the storage circuit 10.

[Capacitance Value and Equivalent Series Resistance Value of Storage Circuit 10]

Figure 3:
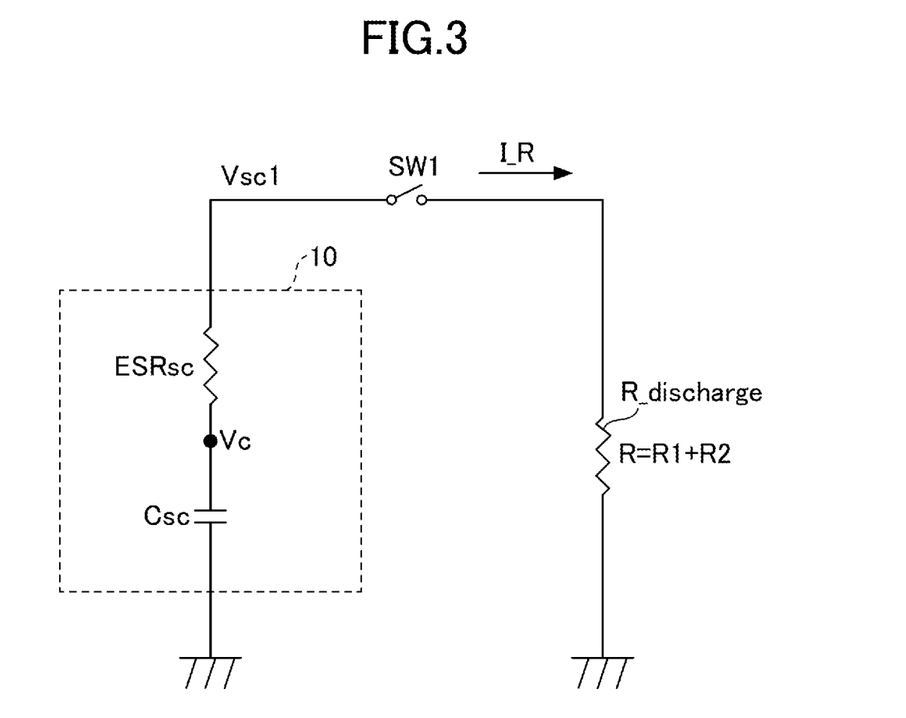
FIG. 3 is an equivalent circuit diagram for measuring a capacitance value and an equivalent series resistance value of a storage circuit in the auxiliary power supply device according to the present embodiment.

The characteristics of the storage circuit 10 in the auxiliary power supply device 1 according to the present embodiment will be described. FIG. 3 is an equivalent circuit diagram for measuring a capacitance value and an equivalent series resistance value of the storage circuit in the auxiliary power supply device 1 according to the present embodiment.

In the storage circuit 10 according to the present embodiment, the electrical double layer capacitor 11 and the electrical double layer capacitor 12 that are connected in series, are equivalently regarded as one capacitor having a capacitance value Csc and one resistor having a resistance value ESRsc and connected in series to the one capacitor. Further, the characteristics of the storage circuit 10 are evaluated using the capacitance value Csc and the resistance value ESRsc.

In addition, the evaluation is performed by regarding the resistor 45 and the resistor 46 that are connected in series, as a discharging resistor R_discharge having a resistance value R (=resistance value R1+resistance value R2). That is, the resistance value R, obtained by adding the resistance value R1 of the resistor 45 and the resistance value R2 of the resistor 46, is set as the resistance value of the discharging resistor R_discharge.

[Measurement of Capacitance Value of Storage Circuit 10]

Characteristic degradation of the electrical double layer capacitor progresses with the use thereof. In a case where the degradation of the electrical double layer capacitor progresses and the capacitance value decreases, a hindrance of the supply of current to the motor may occur, for example, and the time during which the electrical double layer capacitor is usable as the backup power supply may become short, or unlatching of the latch may not become possible. Accordingly, in the auxiliary power supply device 1 according to the present embodiment, the capacitance value of the electrical double layer capacitor is measured, as required, to monitor the capacitance value.

Figure 4:
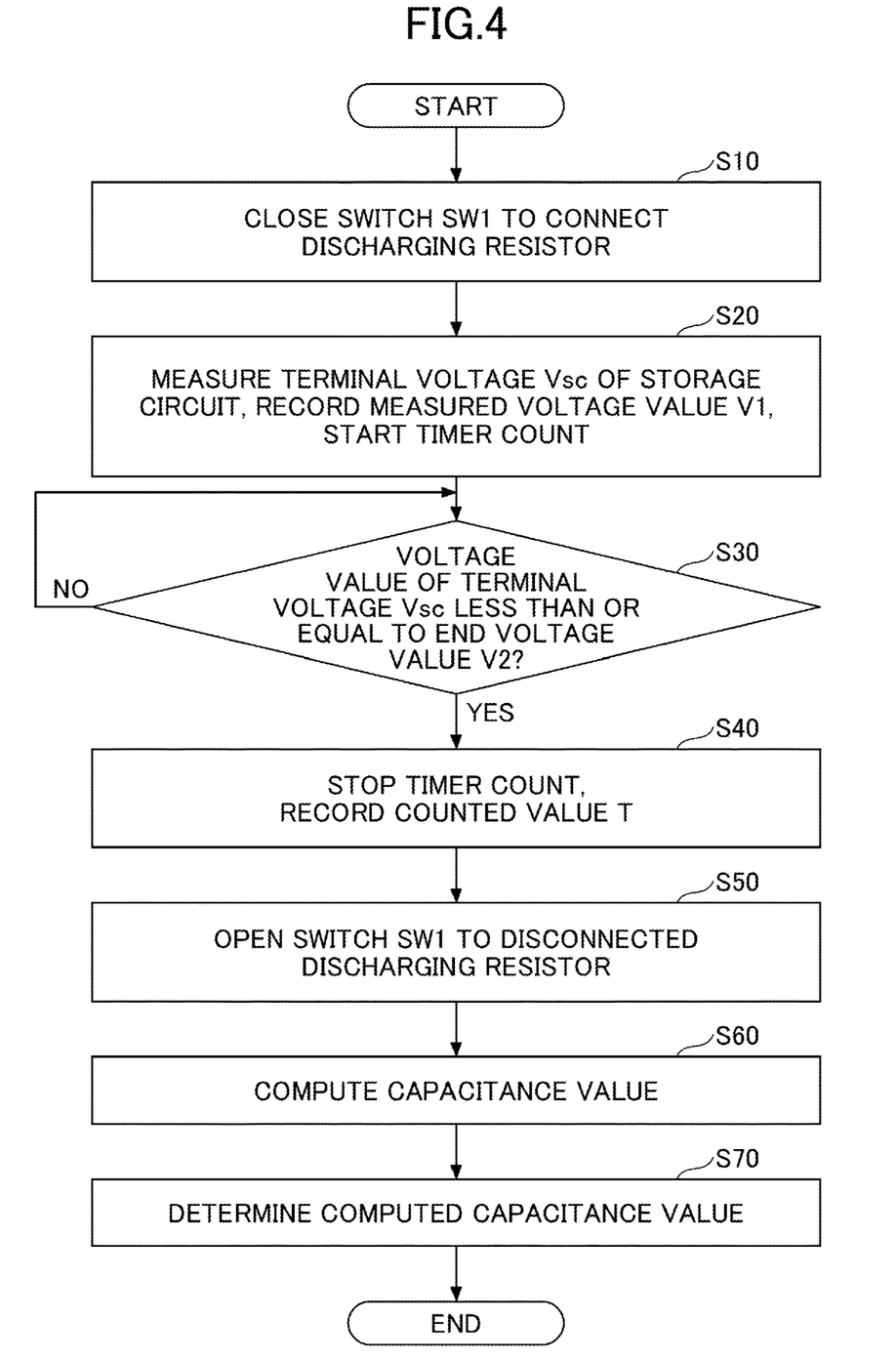
FIG. 4 is a flow chart for measuring the capacitance value of the storage circuit in the auxiliary power supply device according to the present embodiment.

FIG. 4 is a flow chart for measuring the capacitance value of the storage circuit 10 in the auxiliary power supply device 1 according to the present embodiment. When performing this process, the charging circuit 20 and the boosting circuit 30 stop operating. That is, in this state, the storage circuit 10 is not charged by the power supply 100. In addition, in this state, the storage circuit 10 does not supply electric power to the load device 200. Moreover, when performing this process, the storage circuit 10 is in a state charged to a certain extent, such as a state where the charge is greater than or equal to 50% of a full charge, or more preferably greater than or equal to 80% of the full charge.

A processing procedure of the measurement controller 50 of the auxiliary power supply device 1 according to the present embodiment, and steps of a control method of the auxiliary power supply device 1, will be described in conjunction with the flow chart of FIG. 4.

(Step S10)

First, the measurement controller 50 turns on (closes) the switch SW1. When the switch SW1 is turned on (closed), the discharging resistor R_discharge is connected to the storage circuit 10. When the discharging resistor R_discharge is connected to the storage circuit 10, the electric power stored in the storage circuit 10 flows to the ground with a current I_R via the discharging resistor R_discharge. When the electric power stored in the storage circuit 10 flows to the ground with the current I_R, the terminal voltage Vsc of the storage circuit 10 gradually decreases.

(Step S20)

Next, the measurement controller 50 measures the terminal voltage Vsc of the storage circuit 10. Further, the measurement controller 50 records (acquires) the measured voltage value of the terminal voltage Vsc, as a start voltage value V1. In addition, the timer count is started.

(Step S30)

Next, the measurement controller 50 determines whether or not the voltage value of the terminal voltage Vsc of the storage circuit 10 is lower than or equal to an end voltage value V2 that is set to a predetermined value. In a case where the voltage value of the terminal voltage Vsc of the storage circuit 10 is higher than the predetermined end voltage value V2 (NO in step S30), step S30 is repeated again. In a case where the voltage value of the terminal voltage Vsc of the storage circuit 10 is lower than or equal to the predetermined end voltage value V2 (YES in step S30), the measurement controller 50 advances the process to step S40. The end voltage value V2 is set to a value lower than the start voltage value V1.

(Step S40)

Next, the measurement controller 50 stops the timer count, and records the counted value. Further, the measurement controller 50 computes a time T from the start of the timer count from the counted value to the stop of the timer count. The process of step S40 is desirably performed simultaneously as step S30, or as quickly as possible within a range executable by the measurement controller 50 after performing step S30.

(Step S50)

Next, the measurement controller 50 turns off (opens) the switch SW1. When the switch SW1 is turned off (opened), the discharging resistor R_discharge is disconnected from the storage circuit 10.

(Step S60)

Next, the measurement controller 50 computes the capacitance value Csc according to Formula 1, using the measured start voltage value V1 and end voltage value V2, and the time T. The resistance value R is the resistance value of the discharge resistance R_discharge.

In denotes a natural logarithm.

[Formula 1]

$$Csc = -T/(R \times Ln(V2/V1)) \quad \text{(Formula 1)}$$

(Step S70)

Next, based on the computed capacitance value Csc, the measurement controller 50 determines whether or not the storage circuit 10 is normal (whether or not the storage circuit 10 is degraded). For example, in a case where the capacitance value Csc is smaller than a predetermined capacitance value, the measurement controller 50 determines that the storage circuit 10 is abnormal (degraded).

For example, in step S30, when the voltage value of the terminal voltage Vsc of the storage circuit 10 becomes lower than or equal to the end voltage value V2, the terminal voltage Vsc of the storage circuit 10 may be measured again and set as the end voltage value V2. Alternatively, a set time Ts may be set first, and the voltage value of the terminal voltage Vsc of the storage circuit 10 after the time Ts elapses after the switch SW1 is turned on may be measured as the end voltage value V2.

The auxiliary power supply device 1 according to the present embodiment can measure the capacitance value of the storage circuit 10 during a discharge in which a current is discharged from the storage circuit 10. In addition, the auxiliary power supply device 1 according to the present embodiment can monitor the characteristic degradation of the electrical double layer capacitor included in the storage circuit 10, by measuring the capacitance value of the storage circuit 10.

The equalization and discharge circuit 40 of the auxiliary power supply device 1 according to the present embodiment also operates as a discharging circuit that discharges the energy stored in the storage circuit 10. Accordingly, the auxiliary power supply device 1 according to the present embodiment can check the operation of the discharging circuit by measuring the capacitance value of the storage circuit 10.

The start voltage value V1 is an example of a first voltage value, and the end voltage value V2 is an example of a second voltage value.

[Measurement of Equivalent Series Resistance Value of Storage Circuit 10]

The characteristic degradation of the electrical double layer capacitor progresses with the use thereof. In the case where the degradation of the electrical double layer capacitors progresses and the equivalent series resistance value increases, a hindrance of the supply of current to the motor may occur, for example, and the time during which the electrical double layer capacitors are usable as the backup power supply may become short, or unlatching of the latch may not become possible. Accordingly, in the auxiliary power supply device 1 according to the present embodiment, the equivalent series resistance value of the electrical double layer capacitors is measured, as required, to monitor the equivalent series resistance value.

Figure 5:
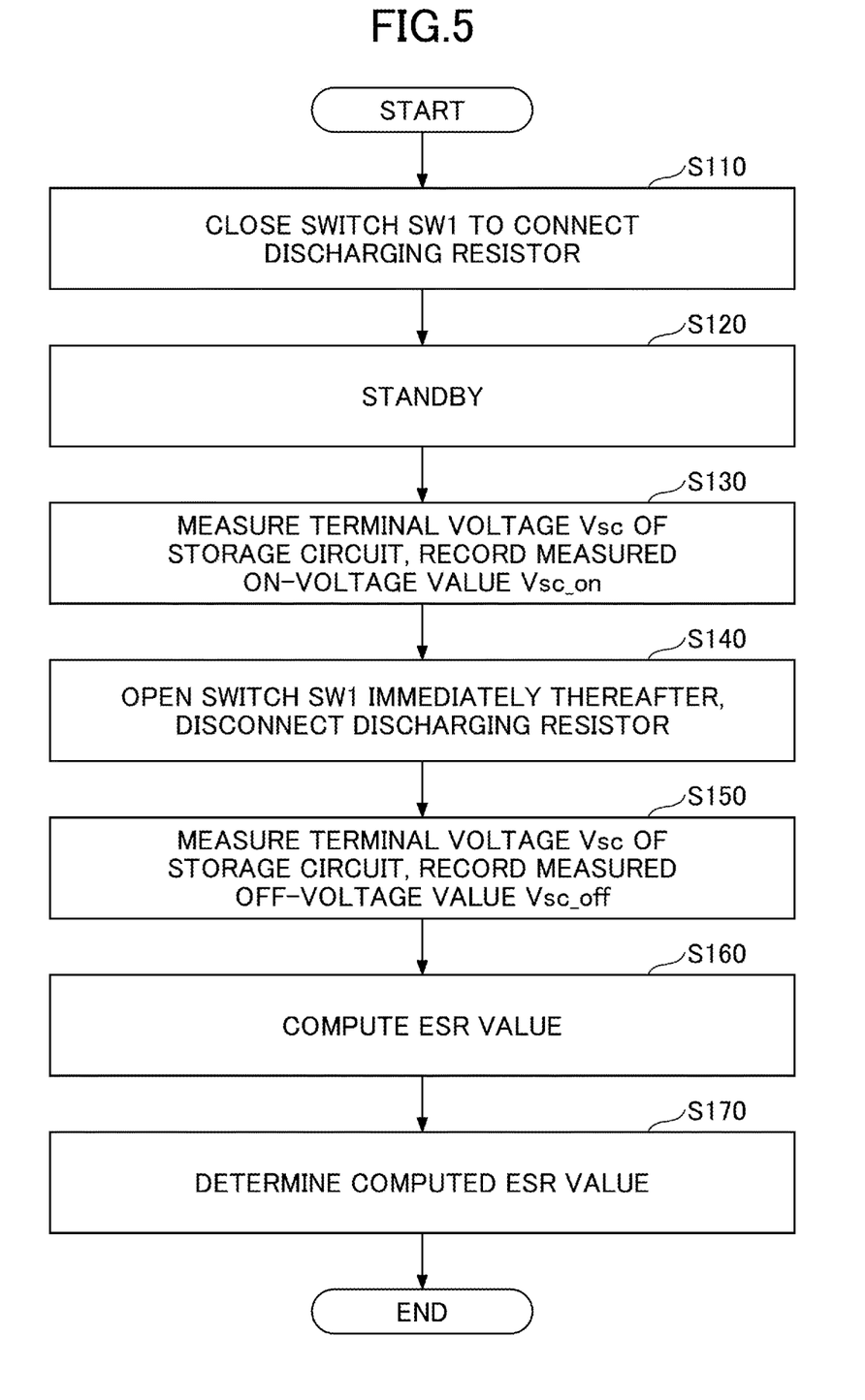
FIG. 5 is a flow chart for measuring the equivalent series resistance value of the storage circuit in the auxiliary power supply device according to the present embodiment.

FIG. 5 is a flow chart for measuring the equivalent series resistance value of the storage circuit 10 in the auxiliary power supply device 1 according to the present embodiment. In a case where this process is performed, the charging circuit 20 and the boosting circuit 30 stop operating. That is, in this state, the storage circuit 10 is not charged by the power supply 100. In addition, in this state, the storage circuit 10 does not supply electric power to the load device 200. Moreover, when performing this process, the storage circuit 10 is in a state charged to a certain extent, such as a state where the charge is greater than or equal to 50% of a full charge, or more preferably greater than or equal to 80% of the full charge.

The processing procedure of the measurement controller 50 of the auxiliary power supply device 1 according to the present embodiment, and steps of the control method of the auxiliary power supply device 1, will be described in conjunction with the flow chart of FIG. 5.

(Step S110)

First, the measurement controller 50 turns on (closes) the switch SW1. When the switch SW1 is turned on (closed), the discharging resistor R_discharge is connected to the storage circuit 10. When the discharging resistor R_discharge is connected to the storage circuit 10, the electric power stored in the storage circuit 10 flows to the ground with the current I_R via the discharging resistor R_discharge. When the electric power stored in the storage circuit 10 flows to the ground with the current I_R, the terminal voltage Vsc of the storage circuit 10 gradually decreases.

(Step S120)

Next, the measurement controller 50 stands by for a certain period of time. For example, the measurement controller 50 stands by for the certain period of time until the current I_R stabilizes.

(Step S130)

Next, the measurement controller 50 measures the terminal voltage Vsc of the storage circuit 10. Further, the measurement controller 50 stores (acquires) the measured voltage value of the terminal voltage Vsc, as an on-time voltage value Vsc_on.

(Step S140)

Next, the measurement controller 50 turns off (opens) the switch SW1, immediately after measuring the terminal voltage Vsc of the storage circuit 10 in step S130. When the switch SW1 is turned off (opened), the discharging resistor R_discharge is disconnected from the storage circuit 10. The process of step S140 is desirably performed simultaneously as step S130, or as quickly as possible within a range executable by the measurement controller 50 after performing step S130.

(Step S150)

Next, after the switch SW1 is turned off (opened), the measurement controller 50 measures the terminal voltage Vsc of the storage circuit 10. Further, the measurement controller 50 stores (acquires) the measured voltage value of the terminal voltage Vsc, as an off-time voltage value Vsc_off.

(Step S160)

Next, the measurement controller 50 computes an equivalent series resistance value ESR according to Formula 2, using the measured on-time voltage value Vsc_on and off-time voltage value Vsc_off. The resistance value R is the resistance value of the discharge resistance R_discharge.

[Formula 2]

$$ESR = (Vsc\_off - Vsc\_on)R/Vsc\_on = R(Vsc\_off/Vsc\_on - 1) \quad \text{(Formula 2)}$$

(Step S170)

Next, based on the computed equivalent series resistance value ESR, the measurement controller 50 determines whether or not the storage circuit 10 is normal (whether or not the storage circuit 10 is degraded). For example, in a case where the equivalent series resistance value ESR is larger than a predetermined resistance value, the measurement controller 50 determines that the storage circuit 10 is abnormal (degraded).

The auxiliary power supply device 1 according to the present embodiment can measure the equivalent series resistance value of the storage circuit 10, during the discharge in which the current is discharged from the storage circuit 10. In addition, the auxiliary power supply device 1 according to the present embodiment can monitor the characteristic degradation of the electrical double layer capacitor included in the storage circuit 10, by measuring the equivalent series resistance value of the storage circuit 10.

Moreover, the equalization and discharge circuit 40 of the auxiliary power supply device 1 according to the present embodiment operates as the discharging circuit that discharges the energy stored in the storage circuit 10. Hence, the auxiliary power supply device 1 according to the present embodiment can check the operation of the discharging circuit, by measuring the equivalent series resistance value of the storage circuit 10.

The on-time voltage value Vsc_on is an example of the first voltage value, and the off-time voltage value Vsc_off is an example of the second voltage value.

[Simultaneous Measurement of Capacitance Value and Equivalent Series Resistance Value of Storage Circuit 10]

The auxiliary power supply device 1 according to the present embodiment can simultaneously monitor the capacitance value and the equivalent series resistance value, by simultaneously measuring the capacitance value and the equivalent series resistance value of the electrical double layer capacitor, as required.

Figure 6:
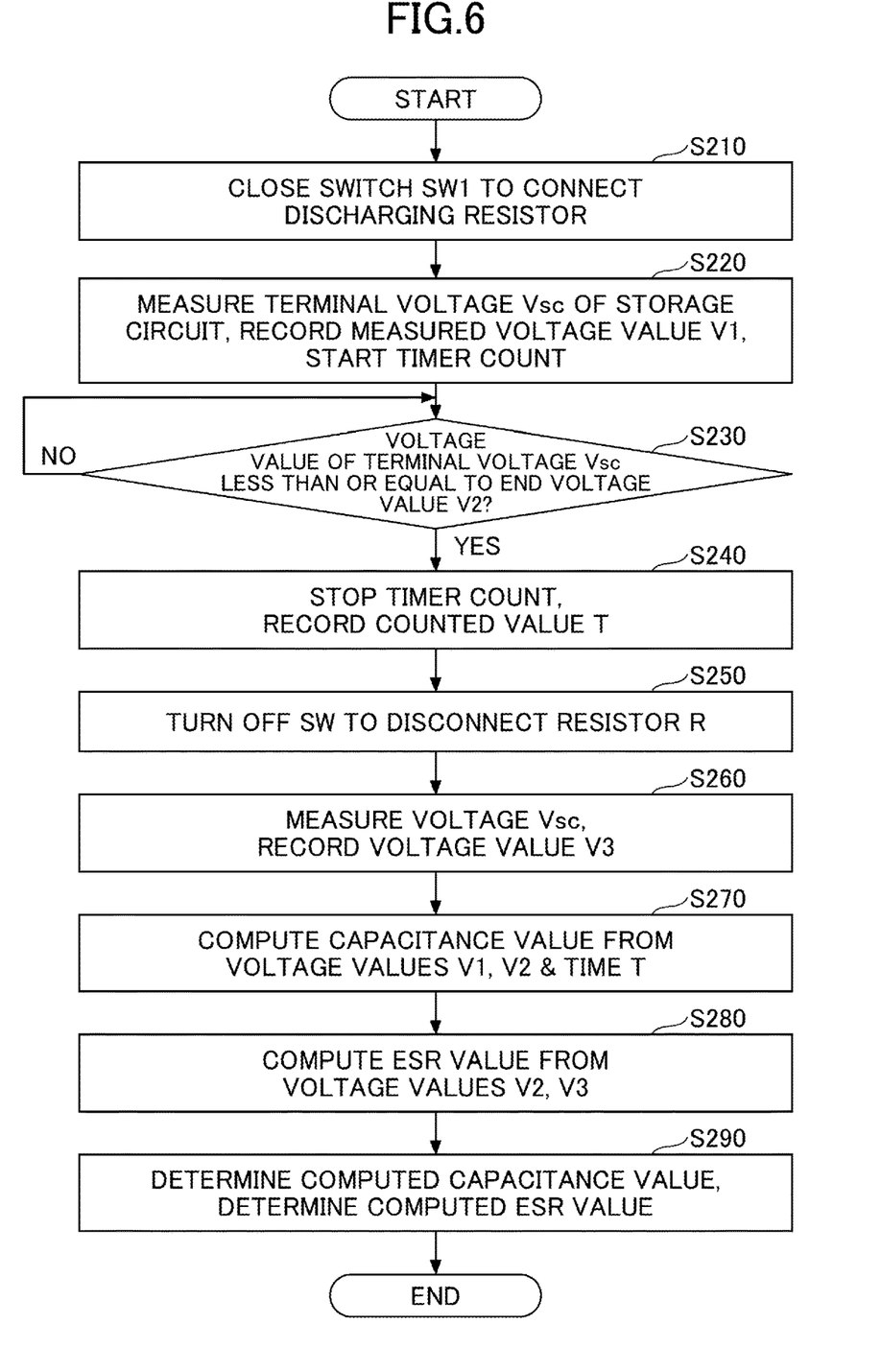
FIG. 6 is a flow chart for measuring the capacitance value and the equivalent series resistance value of the storage circuit in the auxiliary power supply device according to the present embodiment.

FIG. 6 is a flow chart for simultaneously measuring the capacitance value and the equivalent series resistance value of the storage circuit 10 in the auxiliary power supply device 1 according to the present embodiment. When performing this process, the charging circuit 20 and the boosting circuit 30 stop operating. That is, in this state, the storage circuit 10 is not charged by the power supply 100. In addition, in this state, the storage circuit 10 does not supply electric power to the load device 200. When the present process is performed, the storage circuit 10 is in a state charged to a certain extent, such as a state where the charge is greater than or equal to 50% of a full charge, or more preferably greater than or equal to 80% of the full charge.

The processing procedure of the measurement controller 50 of the auxiliary power supply device 1 and the steps of the control method of the auxiliary power supply device 1 according to the present embodiment, will be described in conjunction with the flow chart of FIG. 6.

(Step S210)

First, the measurement controller 50 turns on (closes) the switch SW1. When the switch SW1 is turned on (closed), the discharging resistor R_discharge is connected to the storage circuit 10. When the discharging resistor R_discharge is connected to the storage circuit 10, the electric power stored in the storage circuit 10 flows to the ground with the current I_R via the discharging resistor R_discharge. When the electric power stored in the storage circuit 10 flows to the ground with the current I_R, the terminal voltage Vsc of the storage circuit 10 gradually decreases.

(Step S220)

Next, the measurement controller 50 measures the terminal voltage Vsc of the storage circuit 10. Further, the measurement controller 50 records (acquires) the measured voltage value of the terminal voltage Vsc, as the start voltage value V1. In addition, timer count is started.

(Step S230)

Next, the measurement controller 50 determines whether or not the voltage value of the terminal voltage Vsc of the storage circuit 10 is lower than or equal to the end voltage value V2 that is set to a predetermined value. In a case where the voltage value of the terminal voltage Vsc of the storage circuit 10 is higher than the predetermined end voltage value V2 (NO in step S230), step S230 is repeated again. In a case where the voltage value of the terminal voltage Vsc of the storage circuit 10 is lower than or equal to the predetermined end voltage value V2 (YES in step S230), the measurement controller 50 advances the process to step S240. The end voltage value V2 is set to a value lower than the start voltage value V1.

(Step S240)

Next, the measurement controller 50 stops the timer count, and records the counted value. Further, the measurement controller 50 computes the time T from the start of the timer count from the counted value to the stop of the timer count. The process of step S240 is desirably performed simultaneously as step S230, or as quickly as possible within a range executable by the measurement controller 50 after performing step S230.

(Step S250)

Next, the measurement controller 50 turns off (opens) the switch SW1 immediately after step S240. When the switch SW1 is turned off (opened), the discharging resistor R_discharge is disconnected from the storage circuit 10. The process of step S250 is desirably performed simultaneously as step S240, or as quickly as possible within a range executable by the measurement controller 50 after performing step S240.

(Step S260)

Next, after the switch SW1 is turned off (opened), the measurement controller 50 measures the voltage value of the terminal voltage Vsc of the storage circuit 10. Further, the measurement controller 50 stores the measured voltage value of the terminal voltage Vsc, as an off-time voltage value V3.

(Step S270)

Next, the measurement controller 50 computes the capacitance value Csc according to Formula 1, using the measured start voltage value V1 and end voltage value V2, and the time T. The resistance value R is the resistance value of the discharge resistance R_discharge.

(Step S280)

Next, the measurement controller 50 computes the equivalent series resistance value ESR according to Formula 3, using the end voltage value V2 and the measured off-time voltage value V3. The resistance value R is the resistance value of the discharge resistance R_discharge.

[Formula 3]

$$ESR=(V3-V2)R/V2=R(V3/V2-1) \quad \text{(Formula 3)}$$

(Step S290)

Next, based on the computed capacitance value Csc, the measurement controller 50 determines whether or not the storage circuit 10 is normal (whether or not the storage circuit 10 degraded). For example, in a case where the capacitance value Csc is smaller than a predetermined capacitance value, the measurement controller 50 determines that the storage circuit 10 is abnormal (degraded).

In addition, based on the computed equivalent series resistance value ESR, the measurement controller 50 determines whether or not the storage circuit 10 is normal (whether or not the storage circuit 10 is degraded). For example, in a case where the equivalent series resistance value ESR is larger than a predetermined resistance value, the measurement controller 50 determines that the storage circuit 10 is abnormal (degraded).

The auxiliary power supply device 1 according to the present embodiment can measure the capacitance value and the equivalent series resistance value of the storage circuit 10, during the discharge in which current is discharged from the storage circuit 10. In addition, the auxiliary power supply device 1 according to the present embodiment can monitor the characteristic degradation of the electrical double layer capacitor included in the storage circuit 10, by measuring the capacitance value and the equivalent series resistance value of the storage circuit 10.

The start voltage value V1 is an example of the first voltage value, the end voltage value V2 is an example of the second voltage value, and the off-time voltage value V3 is an example of a third voltage value.

<Equalization Process of Storage Circuit in Auxiliary Power Supply Device and Measurement of Capacitance Value and Equivalent Series Resistance Value>

Next, the equalization process and the measurement of the capacitance value and the equivalent series resistance value of the storage circuit 10 in the auxiliary power supply device 1 will be described.

As described above, in the case where the electrical double layer capacitor is used as the backup energy source of the automobile system, it is necessary to monitor the capacitance value and the equivalent series resistance value in order to manage the degradation of the electrical double layer capacitor in an actual state of use. Hence, a circuit for measuring the capacitance value and the equivalent series resistance value in a vehicle mounted state is required.

In addition, in the circuit in which electrical double layer capacitors are connected in series, an equalization circuit is required to eliminate the voltage sharing imbalance. In the auxiliary power supply device 1 according to the present embodiment, the equalization and discharge circuit 40 performs the measurement of the capacitance value and the equivalent series resistance value, and the equalization process on the electrical double layer capacitor.

Figure 7:
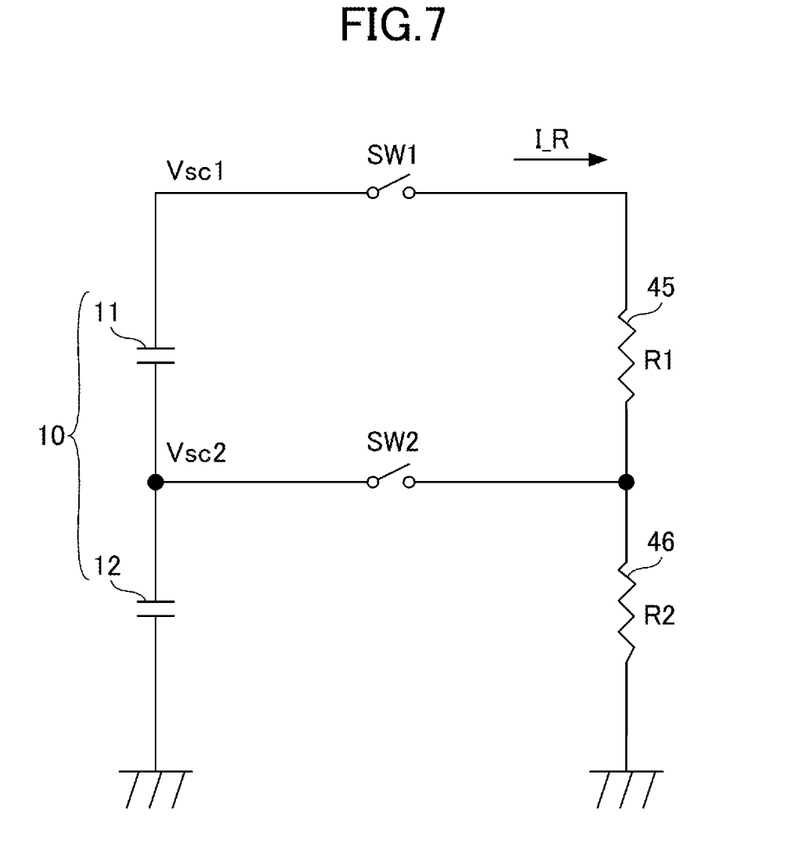
FIG. 7 is a circuit diagram of a circuit that performs an equalization process and measurement of the capacitance value and the equivalent series resistance value of the storage circuit in the auxiliary power supply device according to the present embodiment.
Figure 8:
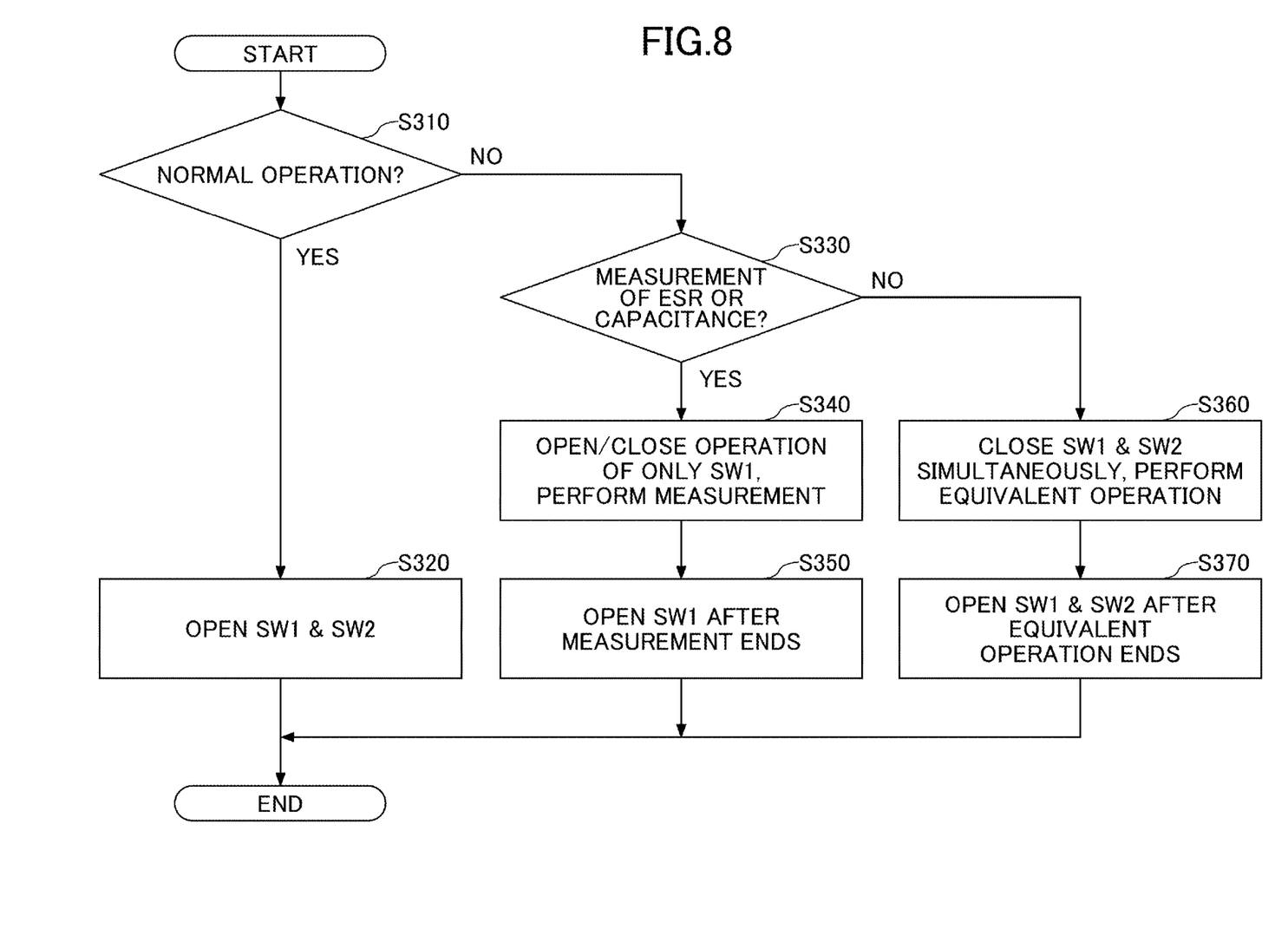
FIG. 8 is a flow chart for performing the equalization process and the measurement of the capacitance value and the equivalent series resistance value of the storage circuit in the auxiliary power supply device according to the present embodiment.

FIG. 7 is a circuit diagram of a circuit that performs the equalization process and the measurement of the capacitance value and the equivalent series resistance value of the storage circuit in the auxiliary power supply device according to the present embodiment. FIG. 8 is a flow chart for performing the equalization process and the measurement of the capacitance value and the equivalent series resistance value of the storage circuit 10 in the auxiliary power supply device 1 according to the present embodiment.

The processing procedure of the measurement controller 50 of the auxiliary power supply device 1 and the steps of the control method of the auxiliary power supply device 1 according to the present embodiment, will be described in conjunction with the flow chart of FIG. 8.

The measurement controller 50 determines whether or not a normal operation is being performed (step S310). In a case where the measurement controller 50 determines that the normal operation is being performed (YES in step S310), the measurement controller 50 turns off (opens) the switch SW1 and the switch SW2.

In step S10, in the case where the measurement controller 50 determines that the normal operation is not being performed (NO in step S310), the measurement controller 50 determines whether or not the equivalent series resistance value or the capacitance value is being measured (step S330).

In the case where the measurement controller 50 determines that the equivalent series resistance value or the capacitance value is being measured (YES in step S330), the measurement controller 50 performs the measurement of the equivalent series resistance value or the capacitance value by turning off (opening)/on (closing) only the switch SW1 (step S340). The measurement of the equivalent series resistance value or the capacitance value is performed, based on the procedure described above. After the measurement in step S340 ends, the switch SW1 is turned off (opened) (step S350).

In step S340, the capacitance value of the storage circuit 10 may be measured, or the equivalent series resistance value of the storage circuit 10 may be measured. In step S340, the capacitance value and the equivalent series resistance value of the storage circuit 10 may be measured simultaneously.

The process of measuring the equivalent series resistance value or the capacitance value in step S340 is an example of a first process.

On the other hand, when the measurement controller 50 determines that the equivalent series resistance value or the capacitance value is not being measured (NO in step S330), the measurement controller 50 turns on (closes) the switch SW1 and the switch SW2 simultaneously, to perform the equalization operation (step S360). After the equalization operation in step S360 ends, the switches SW1 and SW2 are turned off (opened) (step S370).

The process of the equalization operation in step S360 is an example of a second process.

The auxiliary power supply device 1 according to the present embodiment can perform the measurement of the capacitance value and the equivalent series resistance value and the equalization process on the electrical double layer capacitor, using a single circuit configuration. In the auxiliary power supply device 1 according to the present embodiment, because the measurement of the capacitance value and the equivalent series resistance value and the equalization process on the electrical double layer capacitor are performed by the single circuit configuration, the auxiliary power supply device 1 can be simplified by reducing a complexity thereof.

The switch 41 is an example of a switch element. In addition, the switch 41 is an example of a first switch element, and the switch 42 is an example of a second switch element. The electrical double layer capacitor 11 is an example of a first electrical double layer capacitor, and the electrical double layer capacitor 12 is an example of a second electrical double layer capacitor. The resistor 45 is an example of a first discharging resistor, and the resistor 46 is an example of a second discharging resistor.

Although the auxiliary power supply device is described above by way of the embodiments, the present invention is not limited to the embodiments described above. Various modifications and improvements, such as a combination or a replacement of a part or entirety of other embodiments are possible, without departing from the scope of the present invention.

The present application is based on and claims priority to Japanese Patent Application No. 2021-056570, filed on Mar. 30, 2021, and the entire contents of which are incorporated herein by reference.

DESCRIPTION OF REFERENCE NUMERALS

1 Auxiliary power supply device
10 Storage circuit
11 Electrical double layer capacitor
12 Electrical double layer capacitor
20 Charging circuit
30 Boosting circuit
40 Discharging circuit
41, 42 Switch
41a First terminal
41b Second terminal
45, 46 Resistor
50 Measurement controller
100 Power supply
200 Load device
210 Load
220 Load driving circuit
N1 Node
N2 Node
N3 Node

The invention claimed is:

1. An auxiliary power supply device comprising:
a storage circuit having a first node coupled to a power supply, a second node coupled to a ground, and a first electrical double layer capacitor and a second electrical double layer capacitor connected in series between the first node and the second node;
a first switch element having a first terminal coupled to the first node, and a second terminal, and configured to make a connection or disconnection between the first terminal and the second terminal;
a first discharging resistor provided between the second terminal and a fourth node;
a second discharging resistor provided between the fourth node and the ground;
a second switch element having a third terminal coupled to a third node between the first electrical double layer capacitor and the second electrical double layer capacitor, and a fourth terminal coupled to the fourth node, and configured to make a connection or disconnection between the third terminal and the fourth terminal; and
a measurement controller configured to measure a voltage at the first node, and control the first switch element and the second switch element, wherein
the measurement controller performs
a first process including
a procedure making a disconnection between the third terminal and the fourth terminal by the second switch element, and making a connection between the first terminal and the second terminal, by the first switch element,
a procedure measuring the voltage at the first node, to acquire a first voltage value,
a procedure determining whether or not the voltage at the first node is lower than or equal to a second voltage value that is lower than the first voltage value,
a procedure making a disconnection between the first terminal and the second terminal by the first switch element in a case where the voltage at the first node is lower than or equal to the second voltage value,
a procedure computing a time from when the first terminal and the second terminal are connected by the first switch element until when the first terminal and the second terminal are disconnected, and
a procedure computing a capacitance value of the storage circuit, based on the time, the first voltage value, and the second voltage value, and
a second process including
a procedure making a connection between the first terminal and the second terminal by the first switch element, and making a connection between the third terminal and the fourth terminal by the second switch element, and
a procedure making a disconnection between the first terminal and the second terminal by the first switch element, and making a disconnection between the third terminal and the fourth terminal by the second switch element, after a predetermined time elapses.

2. The auxiliary power supply device as claimed in claim 1, wherein the measurement controller computes the capacitance value according to a formula $$Csc = T/(R \times \mathrm{Ln}(V2/V1)),$$

where V1 denotes the first voltage value, V2 denotes the second voltage value, T denotes the time, R denotes a resistance value obtained by adding a resistance value of the first discharging resistor and a resistance value of the second discharging resistor, and Csc denotes the capacitance value is Csc.

3. The auxiliary power supply device as claimed in claim 1, wherein the measurement controller performs
a procedure determining a degradation of the storage circuit, based on the computed capacitance value.

4. The auxiliary power supply device as claimed in claim 1, wherein the measurement controller performs
a procedure measuring the voltage at the first node and acquiring a third voltage value, after the procedure making a disconnection between the first terminal and the second terminal by the first switch element, and
a procedure computing an equivalent series resistance value of the storage circuit, based on the second voltage value and the third voltage value.

5. A control method for controlling an auxiliary power supply device comprising:
a storage circuit having a first node coupled to a power supply, a second node coupled to a ground, and a first electrical double layer capacitor and a second electrical double layer capacitor connected in series between the first node and the second node;
a first switch element having a first terminal coupled to the first node, and a second terminal, and configured to make a connection or disconnection between the first terminal and the second terminal;
a first discharging resistor provided between the second terminal and a fourth node;
a second discharging resistor provided between the fourth node and the ground; and
a second switch element having a third terminal coupled to a third node between the first electrical double layer capacitor and the second electrical double layer capacitor, and a fourth terminal coupled to the fourth node, and configured to make a connection or disconnection between the third terminal and the fourth terminal,
the control method comprising:
a first process including the steps of
making a disconnection between the third terminal and the fourth terminal by the second switch element, and making a connection between the first terminal and the second terminal, by the first switch element,
measuring the voltage at the first node, to acquire a first voltage value, determining whether or not the voltage at the first node is lower than or equal to a second voltage value that is lower than the first voltage value, making a disconnection between the first terminal and the second terminal by the first switch element in a case where the voltage at the first node is lower than or equal to the second voltage value, computing a time from when the first terminal and the second terminal are connected by the first switch element until when the first terminal and the second terminal are disconnected, and computing a capacitance value of the storage circuit, based on the time, the first voltage value, and the second voltage value, and a second process including the steps of making a connection between the first terminal and the second terminal by the first switch element, and making a connection between the third terminal and the fourth terminal by the second switch element, and making a disconnection between the first terminal and the second terminal by the first switch element, and making a disconnection between the third terminal and the fourth terminal by the second switch element, after a predetermined time elapses.

6. An auxiliary power supply device comprising:

a storage circuit having a first node coupled to a power supply, a second node coupled to a ground, and a first electrical double layer capacitor and a second electrical double layer capacitor connected in series between the first node and the second node;

a first switch element having a first terminal coupled to the first node, and a second terminal, and configured to make a connection or disconnection between the first terminal and the second terminal;

a first discharging resistor provided between the second terminal and a fourth node;

a second discharging resistor provided between the fourth node and the ground;

a second switch element having a third terminal coupled to a third node between the first electrical double layer capacitor and the second electrical double layer capacitor, and a fourth terminal coupled to the fourth node, and configured to make a connection or disconnection between the third terminal and the fourth terminal; and a measurement controller configured to measure a voltage at the first node, and control the first switch element and the second switch element, wherein the measurement controller performs a first process including a procedure making a disconnection between the third terminal and the fourth terminal by the second switch element, and making a connection between the first terminal and the second terminal, by the first switch element, a procedure measuring the voltage at the first node, to acquire a first voltage value, a procedure making a disconnection between the first terminal and the second terminal by the first switch element, immediately after measuring the voltage at the first node, a procedure measuring the voltage at the first node, to acquire a second voltage value lower than the first voltage value, after disconnecting between the first terminal and the second terminal by the first switch element, and a procedure computing an equivalent series resistance value of the storage circuit, based on the first voltage value and the second voltage value, and a second process including a procedure making a connection between the first terminal and the second terminal by the first switch element, and making a connection between the third terminal and the fourth terminal by the second switch element, and a procedure making a disconnection between the first terminal and the second terminal by the first switch element, and making a disconnection between the third terminal and the fourth terminal by the second switch element, after a predetermined time elapses.

7. The auxiliary power supply device as claimed in claim 6, wherein the measurement controller computes the equivalent series resistance value according to a formula $$ESR=(V2-V1)R/V1=R(V2/V1-1),$$

where V1 denotes the first voltage value, V2 denotes the second voltage value, R denotes a resistance value obtained by adding a resistance value of the first discharging resistor and a resistance value of the second discharging resistor, and ESR denotes the equivalent series resistance value.

8. The auxiliary power supply device as claimed in claim 6, wherein the measurement controller performs a procedure determining a degradation of the storage circuit, based on the computed equivalent series resistance value.

9. A control method for controlling an auxiliary power supply device comprising:

a storage circuit having a first node coupled to a power supply, a second node coupled to a ground, and a first electrical double layer capacitor and a second electrical double layer capacitor connected in series between the first node and the second node;

a first switch element having a first terminal coupled to the first node, and a second terminal, and configured to make a connection or disconnection between the first terminal and the second terminal;

a first discharging resistor provided between the second terminal and a fourth node;

a second discharging resistor provided between the fourth node and the ground; and a second switch element having a third terminal coupled to a third node between the first electrical double layer capacitor and the second electrical double layer capacitor, and a fourth terminal coupled to the fourth node, and configured to make a connection or disconnection between the third terminal and the fourth terminal, the control method comprising:

a first process including the steps of making a disconnection between the third terminal and the fourth terminal by the second switch element, and making a connection between the first terminal and the second terminal, by the first switch element, measuring the voltage at the first node, to acquire a first voltage value, making a disconnection between the first terminal and the second terminal by the first switch element, immediately after measuring the voltage at the first node, measuring the voltage at the first node, to acquire a second voltage value lower than the first voltage value, after disconnecting between the first terminal and the second terminal by the first switch element, and computing an equivalent series resistance value of the storage circuit, based on the first voltage value and the second voltage value, and a second process including the steps of making a connection between the first terminal and the second terminal by the first switch element, and making a connection between the third terminal and the fourth terminal by the second switch element, and making a disconnection between the first terminal and the second terminal by the first switch element, and making a disconnection between the third terminal and the fourth terminal by the second switch element, after a predetermined time elapses.

\* \* \* \* \*